(12) United States Patent
Park

(10) Patent No.: US 6,614,547 B1
(45) Date of Patent: Sep. 2, 2003

(54) CORDLESS FACSIMILE SYSTEM WITH TELEPHONE ANSWERING FUNCTION AND METHOD FOR CONTROLLING THE SAME

(75) Inventor: Joo-Seung Park, Gumi-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 589 days.

(21) Appl. No.: 09/131,279

(22) Filed: Aug. 10, 1998

(30) Foreign Application Priority Data

Aug. 8, 1997 (KR) ......................................... 1997-37869

(51) Int. Cl.⁷ .............................. G06K 1/00; G06F 15/00
(52) U.S. Cl. ....................... 358/1.15; 358/474; 358/478
(58) Field of Search ................................. 358/474, 448, 358/1.15, 478, 479, 494, 473, 497; 382/313, 314, 317; 379/100, 93.06, 100.01

(56) References Cited

U.S. PATENT DOCUMENTS

| | | | |
|---|---|---|---|
| 4,908,851 A | | 3/1990 | Kotani et al. |
| 4,962,526 A | * | 10/1990 | Kotani et al. ............... 379/100 |
| 5,086,455 A | | 2/1992 | Satomi et al. |
| 5,159,624 A | | 10/1992 | Makita |
| 5,200,991 A | | 4/1993 | Motoyanagi |
| 5,333,179 A | | 7/1994 | Yamamoto et al. |
| 5,353,329 A | | 10/1994 | Hayashi |
| 5,392,447 A | * | 2/1995 | Schlack et al. ............. 395/893 |
| 5,426,511 A | | 6/1995 | Nagatomo |
| 5,442,463 A | | 8/1995 | Ohnishi |
| 5,444,771 A | | 8/1995 | Ohnishi |
| 5,487,105 A | | 1/1996 | Sakai |
| 5,517,557 A | | 5/1996 | Tanaka |
| 5,522,089 A | * | 5/1996 | Kikinis et al. ............... 395/893 |
| 5,684,608 A | | 11/1997 | Charbonnier et al. |
| 5,799,067 A | * | 8/1998 | Kikinis et al. ........... 379/93.06 |
| 5,854,694 A | * | 12/1998 | Payne et al. ................. 358/473 |

* cited by examiner

*Primary Examiner*—Frank G. Font
*Assistant Examiner*—Kevin Kianni
(74) *Attorney, Agent, or Firm*—Robert E. Bushnell, Esq.

(57) ABSTRACT

A cordless facsimile system capable of realizing a telephone answering function, without a separate telephone answering device. The cordless facsimile system with a telephone answering function includes a stationary base unit connected to a public switched telephone network (PSTN) and a cordless, mobile facsimile unit in radio communication with the base unit. The cordless, mobile facsimile unit includes a radio circuit for demodulating a signal input from the base unit and modulating a transmission signal to transmit the modulated signal to the base unit; a voice processor for converting an analog voice signal output from the radio circuit into digital voice data and converting the digital voice data into the analog voice signal to transmit the converted analog voice signal to the radio circuit; a memory for storing voice data for an outgoing message and an incoming message; a controller for establishing a speech path to the PSTN via the base unit upon receiving an incoming ring signal from the base unit, reading the voice data for the outgoing message stored in the memory to transmit the read voice data to the base unit through the voice processor and the radio circuit, and storing in the memory the voice data for the incoming message received from the PSTN via the radio circuit and the voice processor.

15 Claims, 4 Drawing Sheets

CORDLESS FACSIMILE SYSTEM WITH TELEPHONE ANSWERING FUNCTION AND METHOD FOR CONTROLLING THE SAME

CLAIM FOR PRIORITY

This application makes reference to, incorporates the same herein, and claims all benefits accruing under 35 U.S.C. §119 from an application for CORDLESS FACSIMILE SYSTEM WITH TELEPHONE ANSWERING FUNCTION AND METHOD FOR CONTROLLING THE SAME earlier filed in the Korean Industrial Property Office on the 8$^{th}$ of August 1997, and there duly assigned Ser. No. 37869/1997, a copy of which application is annexed hereto.

BACKGROUND OF THE INVENTION

1. Technical Field

The present invention relates to a facsimile system, and in particular, to a cordless facsimile system with a telephone answering function, which is connected to a public (or private) switched telephone network in radio communication with a base unit.

2. Related Art

Generally, a facsimile system having an automatic telephone answering function as disclosed, for example, in U.S. Pat. No. 4,908,851 for Facsimile Apparatus Operable In Facsimile Or Conversation Mode issued to Kotani et al., U.S. Pat. No. 5,086,455 for Facsimile Arrangement having Automatic Answering Telephone Set And Facsimile Set And Switching Process Therefor issued to Satomi et al., U.S. Pat. No. 5,333,179 for Facsimile Apparatus With Automatic Answering Telephone Function issued to Yamamoto et al., U.S. Pat. No. 5,442,463 for Facsimile Machine Having Telephone Answering Function issued to Ohnishi, U.S. Pat. No. 5,444,771 for Facsimile Machine Having Answering Function issued to Ohnishi, U.S. Pat. No. 5,487,105 for Facsimile Apparatus Operable In Facsimile Or Telephone Mode issued to Sakai, and U.S. Pat. No. 5,517,557 for Facsimile Apparatus With Automatic Telephone Answering Function issued to Tanaka, includes a facsimile module for facsimile communication, an attached telephone for telephone communication and a recording device for recording a voice message from a caller. Typically, the facsimile system is connected directly via a telephone line for access to the public switched telephone network. When a remote caller wants to call or send a facsimile to a host facsimile system, the caller accesses to the host facsimile system by dialing its telephone number via a remote telephone or a remote facsimile system. If a caller sends a signal via a telephone when the facsimile system answers in a telephone/facsimile mode, telephone conversation is permitted. If the caller sends a signal via a remote facsimile system when the facsimile system answers in the same telephone/facsimile mode, facsimile communication is permitted. On the other hand, if the caller sends a signal via a telephone when the facsimile system answers in an answering/facsimile mode, an answering message is transmitted to the caller upon signal reception and a voice message from the caller is recorded. If the caller sends a signal via a remote facsimile system when the facsimile system answers in the answering/facsimile mode, facsimile communication is permitted.

In recent years, facsimile systems have become ubiquitous and are commonly available both in the workplace as well as in the home office. Facsimile technology has become more desirable as a means to efficiently facilitate telephonic communication between subscribers. For example, cordless telephone sets with automatic answering function have been incorporated into a facsimile system in the manner described by, for example, U.S. Pat. No. 5,200,991 for Image Communication System Including A Mobile Telephone Set And A Facsimile Device issued to Motoyanagi, and U.S. Pat. No. 5,353,329 for Facsimile Apparatus And Alarm System With Cordless Telephone Set issued to Hayashi, for greater ease of telephonic and facsimile communications between subscribers. Typically, the cordless telephone set is connected to the facsimile system by a flexible cable, and each of the cordless telephone set and the facsimile system has an independent central processing unit which tends to be cost prohibitive. In addition, a separate telephone answering device is installed in the telephone set for realizing the automatic telephone answering function. Other cordless types of facsimile systems are disclosed in U.S. Pat. No. 5,426,511 for Facsimile System With Base Unit Connected To Wire Network And In Communication With Multiple Extension Sets By Wire Or Radio Transmission issued to Nagatomo, and U.S. Pat. No. 5,684,608 for Cordless Communication Facsimile System issued to Charbonnier et al. In Nagatomo '511, the facsimile system is stationary and connected to a telephone network but a plurality of portable extension sets in the form of scanners are cordless and mobile for multiple users to share the common facsimile system. In Charbonnier '608, the facsimile system is intended to operate in two modes: a handset mode in which the system is used as a cordless telephone handset, and a base mode in which the system is used as a conventional facsimile system.

Most recent models of cordless type of facsimile systems with an automatic telephone answering function, as I have observed, rely heavily on a cordless telephone set having a separate telephone answering device for realizing the telephone answering function. Accordingly, there is a need for a cordless facsimile system capable of realizing a telephone answering function without a separate telephone answering device.

SUMMARY OF THE INVENTION

Accordingly, it is an object of the present invention to provide a new and improved facsimile system and process.

It is also an object to provide a cordless facsimile system capable of realizing a telephone answering function without a separate telephone answering device.

It is another object to provide a cordless facsimile system having an automatic telephone answering,device integrated therein for performing a telephone answering function.

It is further an object to provide a cordless facsimile system having a single central processing unit for controlling all facsimile, and telephone functions including a telephone answering function.

These and other objects of the present invention can be achieved by a cordless facsimile system with a telephone answering function which includes a stationary base unit connected to a public switched telephone network (PSTN) and a cordless, mobile facsimile unit in radio communication with the base unit. The cordless, mobile facsimile unit includes a radio circuit for demodulating a reception signal received from the base unit and modulating a transmission signal to transmit the modulated signal to the base unit; a voice processor for converting an analog voice signal output from the radio circuit into digital voice data and converting the digital voice data into the analog voice signal to transmit the converted analog voice signal to the radio circuit; a memory for storing voice data for an outgoing message and an incoming message; a controller for establishing a speech path with the PSTN via the base unit upon receiving an incoming ring signal from the base unit, reading the voice data for the outgoing message stored in the memory to transmit the read voice data to the base unit through the voice processor and the radio circuit, and storing in the memory the voice data for the incoming message received from the PSTN through the radio circuit and the voice processor.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
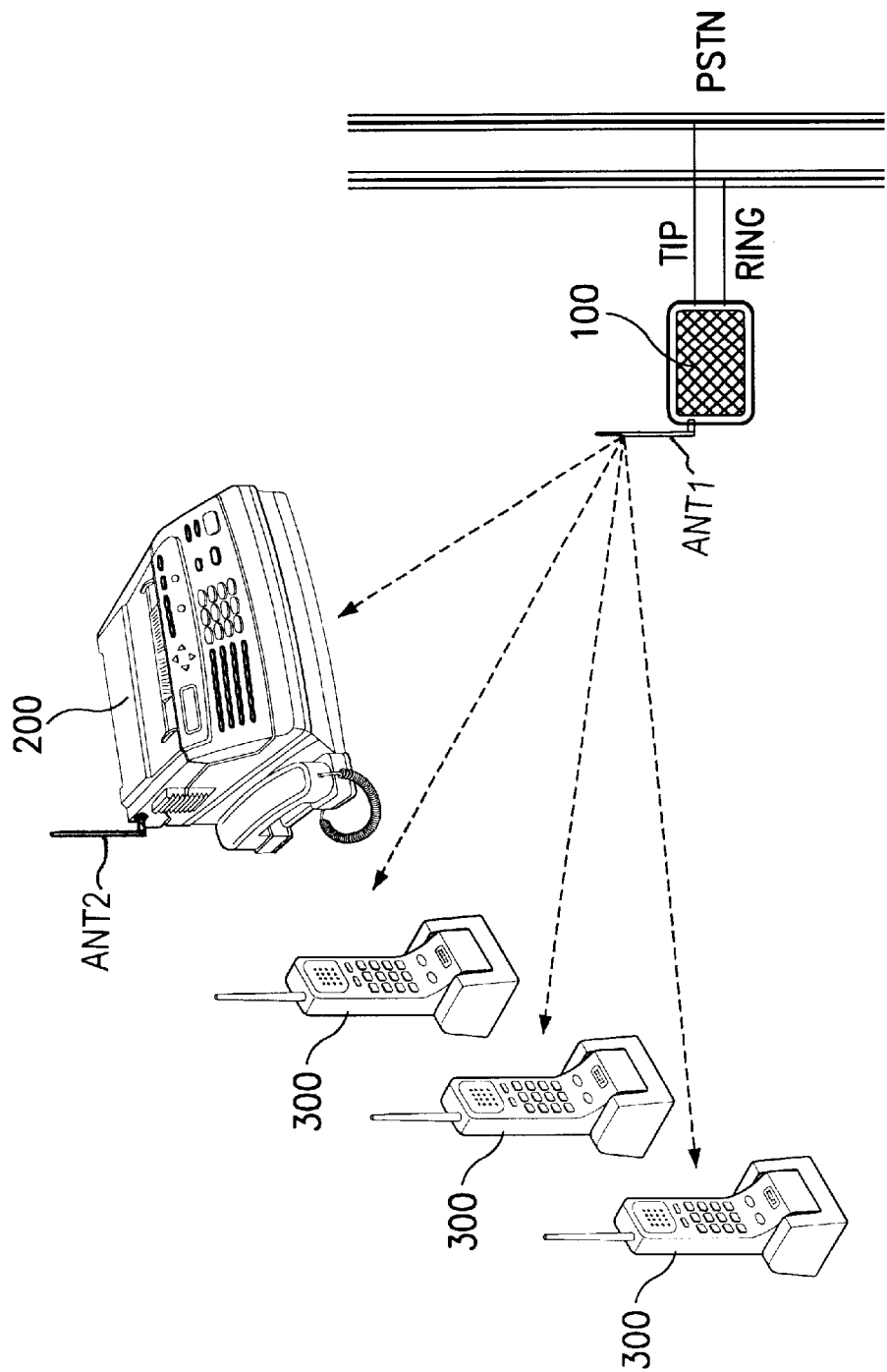
FIG. 1 is a block diagram of a cordless facsimile system connected wirelessly to a public switched telephone network (PSTN) according to the principles of the present invention.

Referring now to the drawings and particularly to FIG. 1, which illustrates a cordless facsimile system having a telephone answering function according to the principles of the present invention. As shown in FIG. 1, the cordless facsimile system includes a stationary base unit 100 connected to a public switched telephone network (PSTN), a cordless, mobile facsimile unit 200, and a plurality of cordless portable telephone units 300. The base unit 100 connected to tip and ring terminals of the public switched telephone network (PSTN) for transmitting a radio frequency (RF) signal received from the PSTN to the cordless facsimile unit 200 or the portable telephone units 300 via an antenna. Alternatively, the base unit 100 transmits a RF signal received from the cordless facsimile unit 200 or the portable telephone units 300 to the PSTN. The cordless, mobile facsimile unit 200 transmits and receives a facsimile message to and from the PSTN through radio communication with the base unit 100, and allows voice communication with a remote subscriber from the PSTN by way of a telephone handset. The portable units 300 perform voice communication with the base unit 100 through radio waves.

Figure 2:
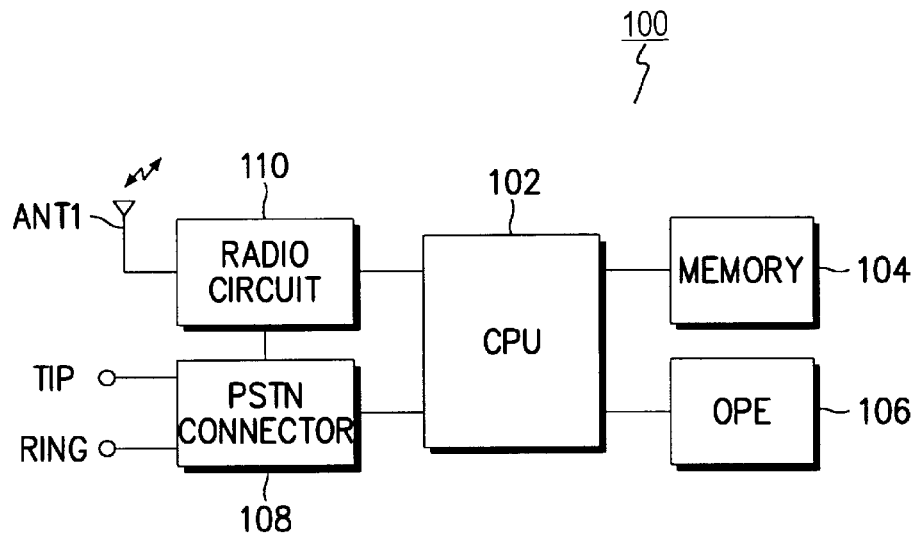
FIG. 2 is a block diagram of a base unit 100 of the cordless facsimile system of FIG. 1.

FIG. 2 illustrates a stationary base unit 100 of the cordless facsimile system constructed according to the principles of the present invention. As shown in FIG. 2, the stationary base unit 100 includes a central processing unit (CPU) 102, a memory 104, an operational panel (OPE) 106, a PSTN connector 108 for connecting to tip and ring terminals of a public switched telephone network (PSTN), and a radio circuit 110 for establishing radio communication with one of the cordless facsimile unit 200 and the portable telephone units 300 via an antenna ANT1. The CPU 102 controls an overall operation of the base unit 100 according to a control program stored in a memory 104. The memory 104 stores the control program of the CPU 102, reference data, and image data. The OPE 106 has a number of keys with which the user can input various commands, and a display unit for providing a visual display of various information under the control of the CPU 102. Key input data from the OPE 16 is provided to the CPU 102. The PSTN connector 108 provides a signal received from the PSTN to a radio circuit 110, and provides a signal received from the radio circuit 110 to the PSTN. The PSTN connector 108 includes a ring signal detector (not shown) and a dialer (not shown), for detecting a ring signal reflecting an incoming call from the PSTN to provide the detected ring signal to the CPU 102 or dial a telephone number under the control of the CPU 102. The radio circuit 110 demodulates a RF signal input from an antenna ANT1 to output the demodulated signal to the CPU 102 and the PSTN connector 108, and modulates a signal input from the CPU 102 and the PSTN connector 108 to output the modulated signal to the outside by way of the antenna ANT1.

Figure 3:
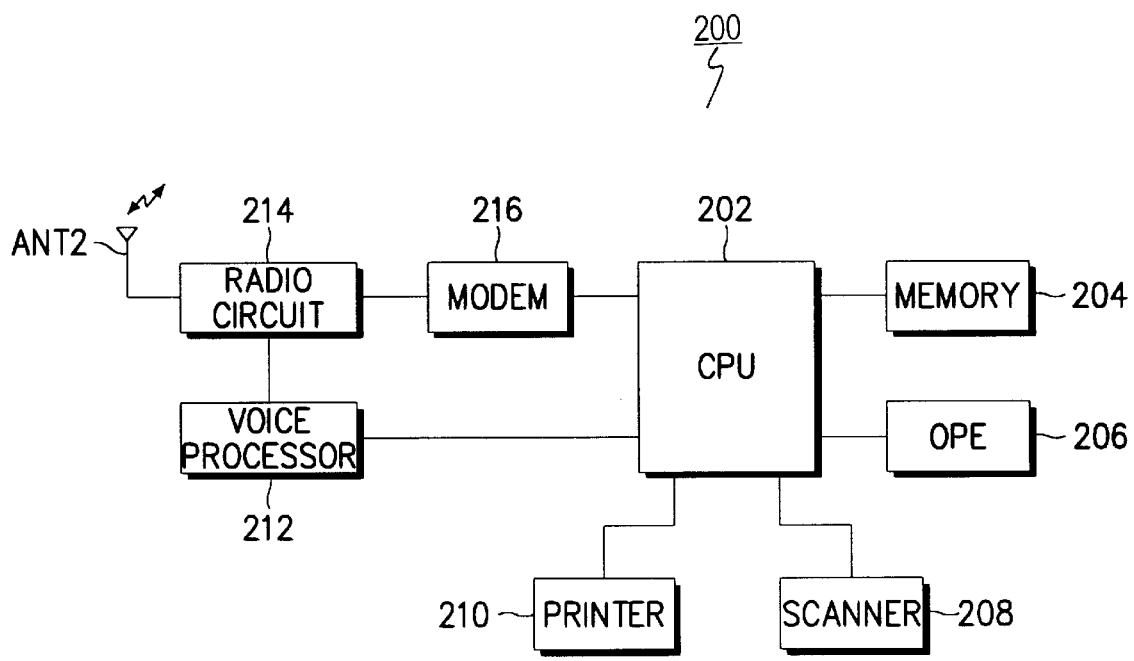
FIG. 3 is a block diagram of a cordless, mobile facsimile unit 200 of the cordless facsimile system of FIG. 1.

FIG. 3 illustrates a cordless, mobile facsimile unit 200 of the cordless facsimile system constructed according to the principles of the present invention. As shown in FIG. 3, the facsimile unit 200 includes a central processing unit 202, a memory 204, an operational panel (OPE) 206, a scanner 208, a printer 210, a voice processor 212, a radio circuit 214 for establishing radio communication with the base unit 100 via an antenna ANT2, and a modem (modulator-demodulator) 216. The CPU 202 controls an overall operation of the facsimile unit 200 according to a control program stored in a memory 204. The memory 204 stores the control program of the CPU 202, the reference data, and the image data. In particular, the memory 204 stores voice data for an outgoing message (OGM) and an incoming message (ICM). The OPE 206 includes a number of keys with which the user can input various commands, and a display unit for providing a visual display of various information under the control of the CPU 202. Key input data from the OPE 206 is provided to the CPU 202. The scanner 208 scans a document to output image data and the printer 210 prints an image on recording paper, under the control of the CPU 202. The voice processor 212 converts an analog voice signal input from a radio circuit 214 into digital voice data to store it in the memory 204, or converts the digital voice data stored in the memory 204 into the analog voice signal to output the same to the radio circuit 214, under the control of the CPU 202. The radio circuit 214 demodulates a RF signal input from an antenna ANT2 to output the demodulated signal to the voice processor 212 and a modem (modulator-demodulator) 216, or modulates a transmission signal input from the voice processor 212 and the modem 216 to transmit the modulated signal to the outside by way of the antenna ANT2. The MODEM 216 demodulates an analog signal input from the radio circuit 214 into digital data to provide the same to the CPU 202, and modulates the digital data output from the CPU 202 into the analog signal to provide the same to the radio circuit 214.

Upon detection of a ring signal reflecting an incoming call from the base unit 100, the CPU 202 establishes a speech path (or a voice communication path) with the PSTN via the base unit 100, and reads the voice data for the outgoing message stored in the memory 204 to transmit the read voice data by means of the voice processor 212 and the radio circuit 214. Alternatively, the CPU 202 stores in the memory 204 the voice data for the incoming message received from the PSTN via the radio circuit 214 and the voice processor 212 in radio communication with the base unit 100.

Figure 4:
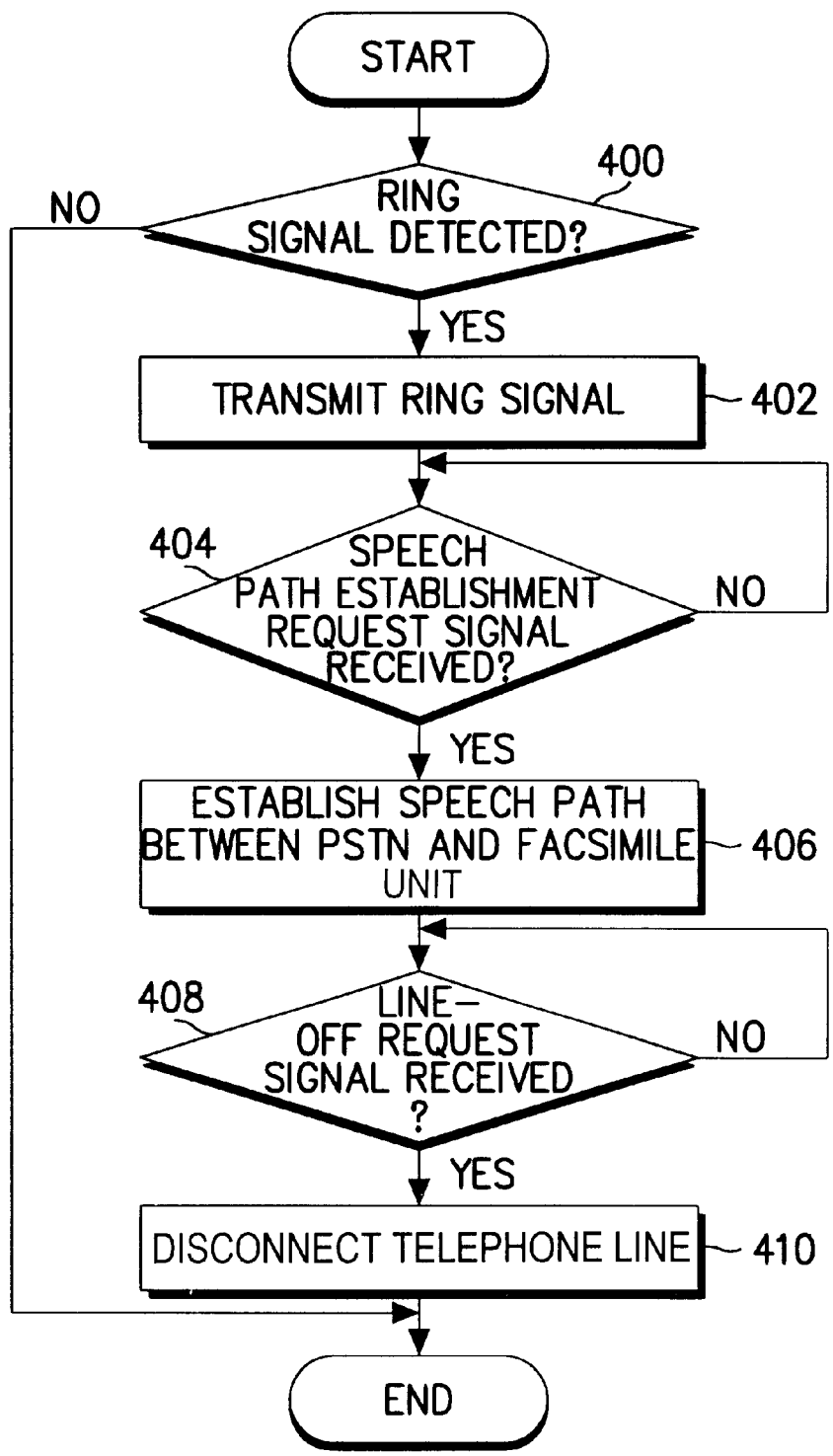
FIG. 4 is a flow chart of the base unit 100 for realizing a radio connection between the cordless, mobile facsimile unit 200 and the public switched telephone network (PSTN) according to a preferred embodiment of the present invention.
Figure 5:
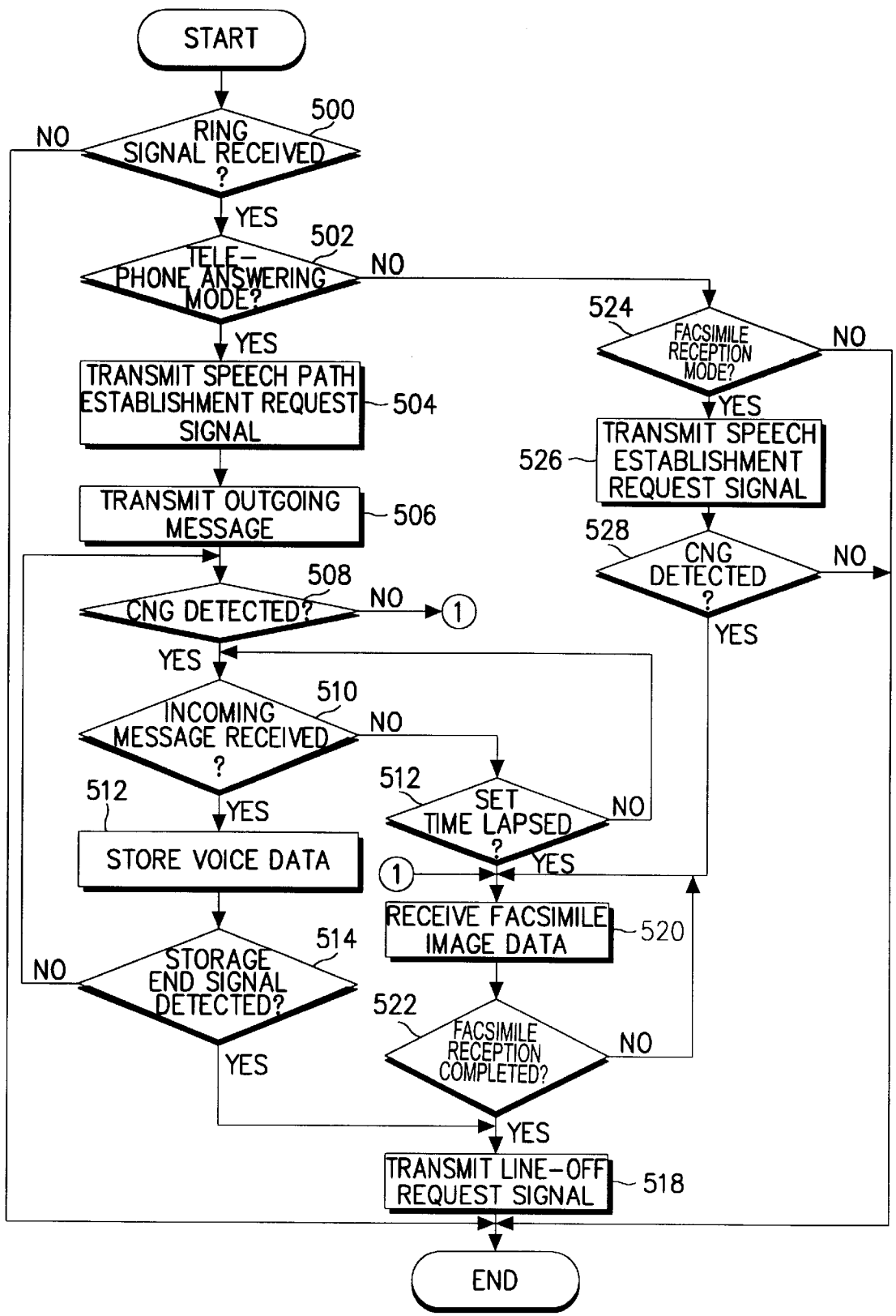
FIG. 5 is a flow chart of the cordless, mobile facsimile unit 200 for realizing a telephone answering function according to a preferred embodiment of the present invention.

FIG. 4 illustrates a process of the base unit 100 for realizing a radio connection between the cordless, mobile facsimile unit 200 and the public switched telephone network (PSTN) according to a preferred embodiment of the present invention. The control flow of FIG. 4 is programmed in the memory 104 and executed by the CPU 102 of the base unit 100. Likewise, FIG. 5 illustrates a process of the facsimile unit 200 for performing a telephone answering mode upon detecting an incoming ring signal from the base unit 100 according to a preferred embodiment of the present invention. The facsimile unit 200 operates in a telephone answering mode in addition to a common facsimile reception mode (or facsimile data reception mode). Similarly, the control flow of FIG. 5 is programmed in the memory 204 and executed by the CPU 202 of the facsimile unit 200.

Now, a preferred embodiment of the present invention will be described in detail with reference to FIGS. 1 to 5 as follows. First, the CPU 102 of the base unit 100 determines whether the PSTN connector 108 has detected a ring signal reflecting an incoming call from the PSTN at step 400. If the ring signal has been detected, the radio circuit 110 transmits the detected ring signal to the cordless facsimile unit 200 and the portable telephone units 300 at step 402, under the control of the CPU 102. Upon receiving the ring signal, the cordless facsimile unit 200 and the portable telephone units 300 provides an audible ringing sound to alert the user of an incoming call. If the subscriber makes (or issues) a call request at the ringing sound by off-hooking any of the portable telephone units 300, the CPU 102 forms a speech path with a selected portable telephone unit 300 which the subscriber made the call request. Such an operation is similar to a known call setup method used for a cordless telephone set.

In accordance with the present invention, after transmitting the ring signal at step 402, the CPU 102 of the base unit 100 waits for a speech path establishment request signal to be received from the facsimile unit 200 at step 404. Meantime, upon receiving the incoming ring signal from the base unit 100 at step 500 of FIG. 5, the CPU 202 of the facsimile unit 200 determines whether a current operational mode of the facsimile unit 200 is a telephone answering mode at step 502. If the facsimile unit 200 is set to the telephone answering mode, the CPU 202 of the facsimile unit 200 transmits the speech path establishment request signal to the base unit 100 at step 504.

Then, upon receiving the speech path establishment request signal from the facsimile unit 200, the CPU 102 of the base unit 100 establishes the speech path between the PSTN and the facsimile unit 200 at step 406, and waits for a line-off request signal from the facsimile unit 200 at step 408. When the line-off request signal is received from the facsimile unit 200, the CPU 102 of the base unit 100 disconnects the telephone line at step 410.

After step 504, the CPU 202 of the facsimile unit 200 reads voice data for the outgoing message stored in the memory 204 and transmits the read voice data to the other subscriber using the voice processor 212 and the radio circuit 214 at step 506. Next, the CPU 202 of the facsimile unit 200 determines at step 508 whether the modem 216 has detected a calling tone (CNG) which indicates that a facsimile of the other party before transmitting a facsimile message.

If the calling tone (CNG) is not detected at step 508, the CPU 202 of the facsimile unit 200 determines for a predetermined time whether the voice data for the incoming message is received from the PSTN, through steps 510 and 512. Here, the predetermined time corresponds to a time required for checking a soundless interval, in case the facsimile of the other party is set to a manual transmission mode. At this moment, if the voice data for the incoming message is received, the CPU 202 of the facsimile unit 200 stores in the memory 204 the voice data for the incoming message received from the PSTN via the radio circuit 214 and the voice processor 212, at step 514. After storing the voice data, the CPU 202 of the facsimile unit 200 checks at step 516 whether a storage end signal is detected or not. If the storage end signal is not detected, the CPU 202 repeats step 508 and its succeeding steps. Otherwise, the CPU 202 of the facsimile unit 200 transmits the line-off request signal to the base unit 100 at step 518 and then ends the program. On the contrary, if the incoming message is not received from the PSTN for the predetermined time at steps 510 and 512, the CPU 202 of the facsimile unit 200 judges that the facsimile of the other party is set to the manual transmission mode and switches the operational mode to the facsimile reception mode to receive the facsimile message as usual, at steps 520 and 522. After completion of receiving the facsimile message, the CPU 202 determines whether a calling tone (CNG) is detected at step 518.

If the calling tone (CNG) is detected at step 508, the CPU 202 performs steps 520 and 522, judging that the facsimile of the other party is set to an automatic transmission mode. Further, if the facsimile unit 200 is not set to the telephone answering mode at step 502, the CPU 202 checks at step 524 whether the facsimile unit 200 is set to the facsimile reception mode or not. As the result, if the facsimile unit 200 is not set to the facsimile reception mode, the CPU 202 ends the program, and otherwise, transmits the speech path establishment request signal to the base unit 100 at step 526. After that, the CPU 202 checks at step 528 whether the calling tone (CNG) is detected or not. As the result, if the calling tone is detected, the CPU 202 performs steps 520 and 522, and otherwise, ends the program.

In this way, the cordless facsimile system can realize a telephone answering function without a separate telephone answering device. In particular, after transmitting the outgoing message to the other party, the facsimile system automatically receives the voice data for the incoming message or performs the facsimile reception mode according to the set operational mode of the other party's facsimile.

As described above, the cordless facsimile system of the invention realizes the telephone answering function, without the separate telephone answering device, thereby reducing the number of the devices and making the connection simple. Therefore, it is possible to readily change the position where the devices are located.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A unitary, portable, wireless, cordless facsimile unit with a telephone answering function, said facsimile unit adapted to communicate via a base unit connected to a telephone network, said facsimile unit comprising a single housing in which is located:
   a radio circuit for demodulating a reception signal received from the base unit via an antenna, and for modulating a transmission signal for transmission to the base unit via said antenna;
   a voice processor for converting an analog voice signal output from the radio circuit into digital voice data and converting the digital voice data into the analog voice signal for transmission to the radio circuit;
   a memory for storing voice data for an outgoing message and an incoming message;
   a controller having means for establishing a speech path with the telephone network via the base unit upon receiving a ring signal reflecting an incoming call from the base unit, means for reading the voice data for the outgoing message stored in the memory to transmit the read voice data to the base unit through the voice processor and the radio circuit, and means for storing in the memory the voice data for the incoming message received from the telephone network through the radio circuit and the voice processor.

2. The unit of claim 1, wherein said controller comprises means for switching an operational mode to a facsimile reception mode to receive a facsimile message from the telephone network via the base unit, when the voice data for the incoming message is not received for a predetermined time after transmitting the voice data for the outgoing message.

3. The unit of claim 1, wherein said controller comprises means for switching an operational mode to a facsimile reception mode, when a calling tone is detected after transmitting the voice data for the outgoing message.

4. The unit of claim 1, wherein unit incorporates a telephone handset for telephonic communication.

5. The unit of claim 1, wherein said base unit comprises:
   a memory for storing a control program for operation of the base unit;
   a central processing unit for controlling an overall operation of the base unit according to said control program;
   an operating panel having a key input unit for setting various functions, modes and dial commands, and a display unit for providing a visual display of various information under the control of the central processing unit;
   a telephone network connector connected to tip and ring terminals of the telephone network, and including a ring signal detector and a dialer for detecting a ring signal reflecting an incoming call from the telephone network and dialing a telephone number under the control of the central processing unit; and
   a radio circuit connected to the telephone network connector and the central processing unit, said radio circuit comprising means for demodulating a reception signal input from an antenna to output the demodulated signal to the central processing unit and the telephone network connector, and means for modulating a transmission signal input from the central processing unit and the telephone network to output the modulated signal via said antenna.

6. A method for controlling a cordless facsimile system including a base unit connected to a telephone network, and a unitary, portable, wireless cordless facsimile unit in radio communication with said base unit said facsimile unit comprising a single housing in which is located a memory for storing voice data, a voice processor for converting an analog voice signal to digital voice data and the digital voice data to the analog voice signal, and a radio circuit for radio communication with the base unit, said method comprising the steps of:
   (1) upon receiving a ring signal reflecting an incoming signal from the base unit, establishing a speech path with the telephone network via the base unit, when the cordless facsimile unit is set in a telephone answering mode;
   (2) reading the voice data for the outgoing message stored in the memory to transmit the read voice data to the base unit through the voice processor and the radio circuit in a form of a radio frequency; and
   (3) storing in the memory the voice data for the incoming message received from the telephone network through the radio circuit and the voice processor in a form of a radio frequency.

7. The method of claim 6, further comprising a step of switching an operational mode to a facsimile reception mode to receive a facsimile message from the telephone network via the base unit, when the voice data for the incoming message is not received for a predetermined time after transmitting the voice data for the outgoing message.

8. The method of claim 6, further comprising a step of switching an operational mode to a facsimile reception mode, when a calling tone is detected after transmitting the voice data for the outgoing message.

9. The method of claim 6, wherein said cordless facsimile unit incorporates a telephone handset for telephonic communication.

10. The method of claim 6, wherein said base unit comprises:
   a memory for storing a control program for operation;
   a central processing unit for controlling an overall operation of the base unit according to said control program;
   an operating panel having a key input unit for setting various functions, modes and dial commands, and a display unit for providing a visual display of various information under the control of the central processing unit;
   a telephone network connector connected to tip and ring terminals of the telephone network, and including a ring signal detector and a dialer for detecting a ring signal reflecting an incoming call from the telephone network and dialing a telephone number under the control of the central processing unit; and
   a radio circuit connected to the telephone network connector and the central processing unit, said radio circuit comprising means for demodulating a reception signal input from an antenna to output the demodulated signal to the central processing unit and the telephone network connector, and means for modulating a transmission signal input from the central processing unit and the telephone network to output the modulated signal via said antenna.

11. A cordless facsimile system with a telephone answering function, comprising:

a stationary base unit connected to a telephone network and disposed for radio communication, said stationary base unit comprising:

a first memory for storing a control program for operation;

a first controller for controlling an overall operation of the stationary base unit according to said control program;

an operating panel having a key input unit for setting various functions, modes and dial commands, and a display unit for providing a visual display of various information under the control of said first controller;

a telephone network connector connected to tip and ring terminals of said telephone network, for detecting a ring signal reflecting an incoming call from said telephone network and dialing a telephone number under the control of said first controller; and a radio circuit connected to said telephone network connector and said first controller, said circuit comprising means for demodulating a reception signal input from a first antenna to output the demodulated signal to said first controller and said telephone network connector, and means for modulating a transmission signal input from said first controller and said telephone network to output the modulated signal via said first antenna; and a unitary, portable, wireless, cordless, mobile facsimile unit disposed for radio communication with said stationary base unit, said wireless facsimile unit comprising a single housing in which is located:

a second radio circuit having means for demodulating a reception signal received from the stationary base unit via a second antenna, and means for modulating a transmission signal for transmission to the stationary base unit via said second antenna;

a voice processor for converting an analog voice signal output from said second radio circuit into digital voice data and converting the digital voice data into the analog voice signal for transmission to said second radio circuit;

a second memory for storing voice data for an outgoing message and an incoming message;

a second controller comprising means for establishing a speech path with said telephone network via the stationary base unit upon receiving a ring signal reflecting an incoming call from the stationary base unit, means for reading the voice data for the outgoing message stored in the memory to transmit the read voice data to the base unit through said voice processor and said second radio circuit, and means for storing in the memory the voice data for the incoming message received from said telephone network through said second radio circuit and said voice processor.

12. The cordless facsimile system of claim 11, wherein said second controller comprises means for switching an operational mode to a facsimile reception mode to receive a facsimile message from said telephone network via the base unit, when the voice data for the incoming message is not received for a predetermined time after transmitting the voice data for the outgoing message.

13. The cordless facsimile system of claim 12, wherein said second controller comprises means for switching an operational mode to a facsimile reception mode, when a calling tone is detected after transmitting the voice data for the outgoing message.

14. The cordless facsimile system of claim 11, wherein said housing of said cordless, mobile facsimile unit incorporates a telephone handset for telephonic communication.

15. The cordless facsimile system of claim 13, wherein said housing of said cordless, mobile facsimile unit incorporates a telephone handset for telephonic communication.

\* \* \* \* \*